United States Patent [19]
Andren et al.

[11] Patent Number: 5,883,921
[45] Date of Patent: *Mar. 16, 1999

[54] SHORT BURST ACQUISITION CIRCUIT AND METHOD FOR DIRECT SEQUENCE SPREAD SPECTRUM LINKS

[75] Inventors: Carl Frank Andren, Indialantic; Leonard Victor Lucas, Palm Bay; John Christ Fakatselis, Palm Bay; Jim Snell, Palm Bay, all of Fla.

[73] Assignee: Harris Corporation, Melbourne, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 509,587

[22] Filed: Jul. 31, 1995

[51] Int. Cl.$^6$ ............................... H04B 7/08; H04L 1/06; H04K 1/00
[52] U.S. Cl. ........................ 375/208; 375/347; 455/135; 455/277.2
[58] Field of Search ..................................... 375/200, 208, 375/347, 267; 455/134, 135, 133, 272, 277.1, 277.2, 275; 340/825.03, 825.72

[56] References Cited

U.S. PATENT DOCUMENTS

| | | | |
|---|---|---|---|
| 4,485,358 | 11/1984 | Andren et al. | 332/23 R |
| 5,131,006 | 7/1992 | Kamerman et al. | 375/1 |
| 5,621,770 | 4/1997 | Zastera | 375/347 |
| 5,648,992 | 7/1997 | Wright et al. | 375/347 |

*Primary Examiner*—Chi H. Pham
*Assistant Examiner*—William Luther
*Attorney, Agent, or Firm*—Rogers & Killeen

[57] ABSTRACT

A digital data radio receiver and method evaluates a data signal preamble received on an antenna to determine whether the antenna should receive the data signal following the preamble. The receiver determines frequency offsets from a desired frequency for each symbol in a block of symbols in the preamble, determines the variance of the frequency offsets, determines the average magnitude of the symbols in the block of symbols, where the determination of average magnitude may be performed in parallel with the determination of variance of the frequency offsets, and evaluates the variance and the average magnitude for the block of symbols to determine whether the preamble is actually noise and to assess reception quality at the antenna. In a two antenna diversity receiver system, these steps may be performed first on a block of symbols received at one antenna and then performed on the next block of symbols received at another antenna. This provides two evaluations that may be compared to select the antenna with the best reception.

26 Claims, 2 Drawing Sheets

SHORT BURST ACQUISITION CIRCUIT AND METHOD FOR DIRECT SEQUENCE SPREAD SPECTRUM LINKS

BACKGROUND OF THE INVENTION

This application is related to application Ser. No. 08/509,586 entitled A Method of Estimating Signal Quality for a Direct Sequence Spread Spectrum Receiver; application Ser. No. 08/509,588 now U.S. Pat. No. 5,654,911 entitled Fast Acquisition Bit Timing Loop Method and Apparatus; application Ser. No. 08/509,590 entitled Short Burst Direct Acquisition Direct Sequence Spread Spectrum Receiver; application Ser. No. 08/509,589 now U.S. Pat. No. 5,675,339 entitled A/D Reference Level Adjustment Circuit to Maintain an Optimum Dynamic Range at the A/D all of which are incorporated by reference, and are filed concurrently herewith and assigned to the assignee hereof.

The present invention relates digital data radio receivers, and more particularly to a digital data radio receiver with diverse antennas and method in which a data signal preamble is rapidly evaluated to determine which of the antennas is best used to receive the subsequent data signal.

A network of digital data radios may operate as a loosely coupled network of nodes in which each receiver is required to rapidly acquire data transmissions without prior knowledge of the time of transmission, frequency offset of the transmission (from a known frequency), or the transmission mode.

A typical data transmission includes a data signal preceded by a preamble that typically consists of a scrambled all-ones pattern, followed by a unique word. The radio receiver is expected to acquire the preamble before attempting to demodulate the data signal that follows. The probability of detecting and acquiring the preamble is desirably high and the false alarm rate (declaring acquisition on noise) is desirably low, even in a noisy environment. Further, the receiver desirably is sufficiently robust to accommodate carrier frequency offsets that can create phase rotations of 45° per symbol (the term symbol is used herein to refer to the units used in the preamble format, e.g., spread spectrum BPSK), and to accommodate rapid changes in noise level.

Receivers in such systems may have a single antenna, or several diverse antennas to improve reception. Receivers connected to multiple antennas are expected to identify the one of the multiple antennas that is to receive the data signal that follows the preamble, and because the preamble has a set length the receiver must attempt to acquire the preamble on all of the antennas and identity the best antenna within the limited time period of the preamble.

Prior art receivers are typically too slow to operate effectively with multiple antennas, and even with only one antenna do not operate with high probability of detection and low false alarm rate in a noisy environment. For example, typical receivers use a symbol length matched filter with the output acquired by a phase locked loop to remove the offset frequency of the carrier. Acquisition is declared based on the amplitude of the correlation peaks from the matched filter. The disadvantage of this approach is that the phase locked loop is slow and may have large amounts of the jitter if the signal level is near the noise level. To avoid this problem in multiple antenna systems, it is known to provide parallel processing paths for the antennas, with the attendant added cost and complexity of separate phase locked loop circuits for each processing path.

Accordingly, it is an object of the present invention to provide a novel digital data radio receiver and method that is suitable for operation with one or multiple antennas and is able maintain an acceptable probability of detection and false alarm rate, while avoiding the problems of the prior art.

It is another object of the present invention to provide a novel digital data radio receiver and method in which the variance of frequency offsets for symbols in a block of symbols in the preamble and the average magnitude of the symbols in the block of symbols are determined, and in which these values are used together to evaluate the presence and quality of a data transmission.

It is still another object of the present invention to provide a novel digital data radio receiver and method in which the variance of frequency offsets and average magnitude of symbols in several blocks of symbols in the preamble are evaluated to improve the accuracy of the evaluation of whether a detected signal is noise or a data signal preamble.

It is yet another object of the present invention to provide a novel digital data radio receiver with antenna diversity and method in which blocks of symbols from a data signal preamble are provided from alternating antennas serially to the receiver for processing and determination whether a signal is present and which antenna has the higher quality reception.

It is a further object of the present invention to provide a novel digital data radio receiver and method in which the receiver has a demodulator with correlators for providing output signals and in which the correlators sample each symbol in a block of symbols in the preamble at twice a predetermined chip rate and store each of the samples, while using every other stored sample to determine correlator output signals.

It is yet a further object of the present invention to provide a novel demodulator for a digital data radio receiver in which outputs from correlators for I and Q components are combined and converted to polar coordinates, and in which the angle and magnitude in the polar coordinate signal are used to determine the variance of the frequency offset and the signal level that are in turn used to evaluate signal quality.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

An embodiment of the receiver and method of the present invention evaluates a data signal preamble received on an antenna to determine whether the antenna should receive the data signal following the preamble. The receiver determines frequency offsets from a desired frequency for symbols in the preamble, determines the variance of the frequency offsets, determines the average magnitude of the symbols, where the determination of average magnitude may be performed in parallel with the determination of variance of the frequency offsets, and evaluates the variance and the average magnitude to determine whether the preamble is actually noise and to assess reception quality at the antenna. The receiver may divide the preamble into blocks of symbols, and the steps may be repeated on a block-by-block basis until acquisition is declared. The evaluation results from several blocks may be used to improve the accuracy of the determination whether the received preamble is noise.

Figure 1:
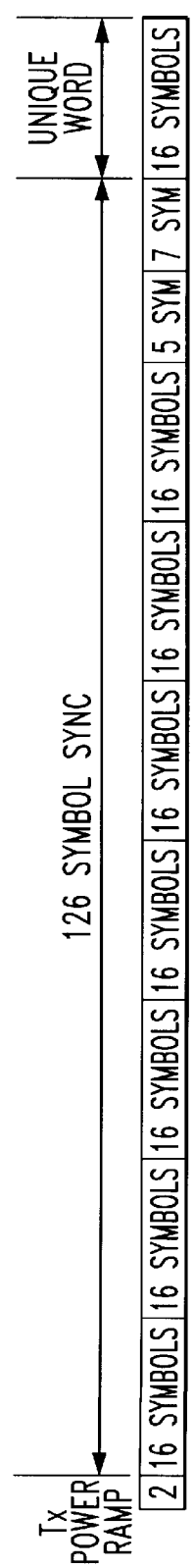
FIG. 1 is a schematic depiction of a preamble for a data signal as broken into blocks by the receiver.

An example of a preamble is depicted in FIG. 1. The preamble includes a stream of symbols that the receiver may group into one or more blocks, followed by a unique word. There are seven blocks with sixteen symbols per block in this example, with two symbols being ignored due to ramping of the transmitter power amplifier, and twelve symbols between the blocks and the unique word that are used for other purposes, although the invention is not so limited.

In an embodiment of the invention in a two antenna diversity receiver system, the steps may be performed first on a block of symbols received at one antenna and then performed on the next block of symbols received at another antenna. This provides two evaluations that may be compared to select the antenna with the best reception. The results may be improved if the comparison is based on two consecutive blocks of data from each antenna (consecutive blocks from one antenna being separated by a block from the other antenna in this embodiment).

Figure 2:
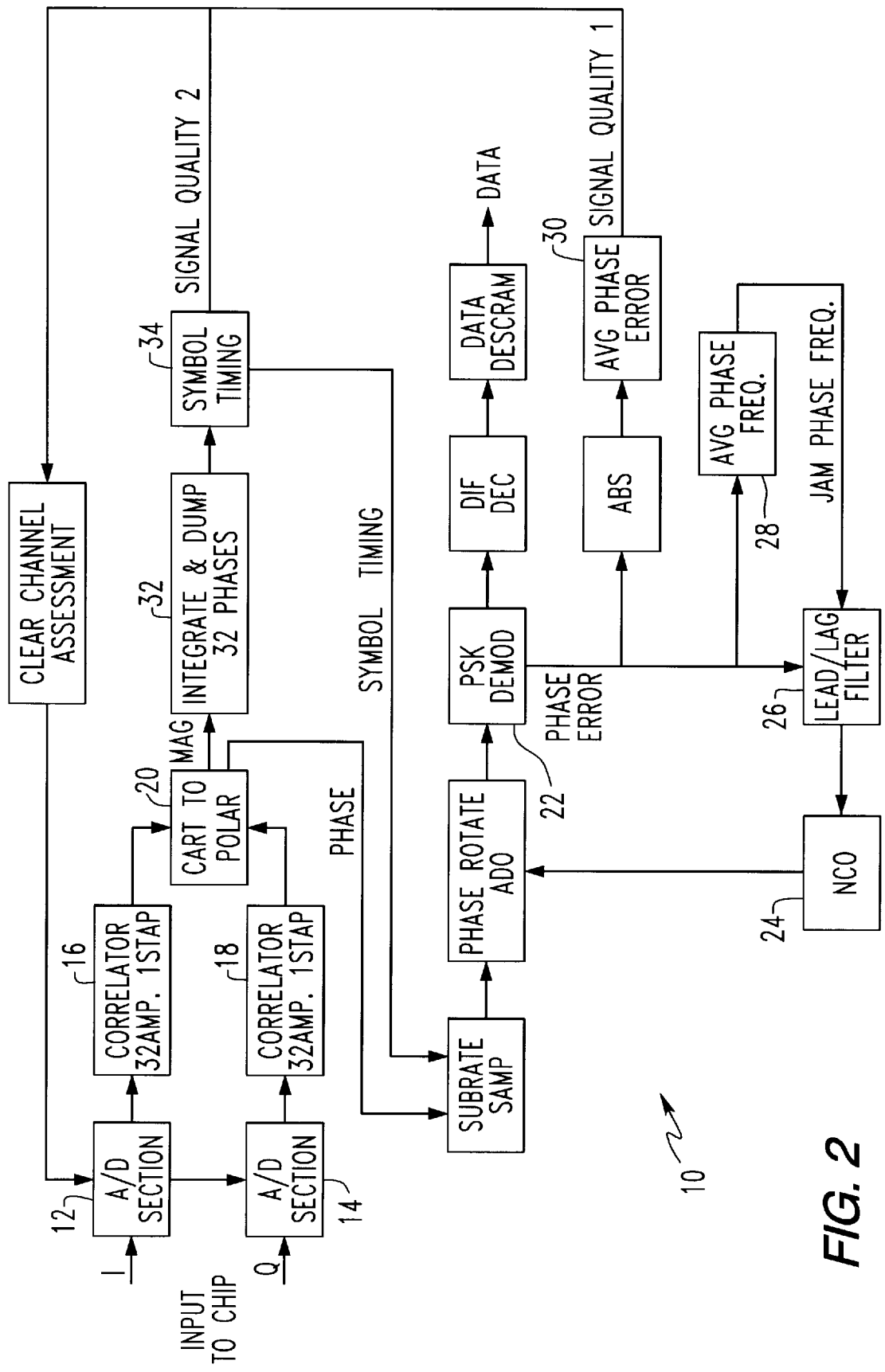
FIG. 2 is a block diagram of an embodiment of the demodulator in a digital data radio receiver of the present invention.

By way of further explanation, and with reference to FIG. 2, symbols in a received signal may be provided to a demodulator 10 for processing on a block-by-block basis (the signal is presumed to be a preamble until proven otherwise, and is referred to herein as a preamble even though it is more accurately a potential preamble). I and Q components are provided through analog to digital converters 12 and 14 to correlators 16 and 18 to remove the symbol spreading sequence (discussed further below). Outputs from correlators 16 and 18 are combined and converted from Cartesian to polar coordinate form in converter 20. The phase stream from converter 20 is decimated to the symbol rate using timing derived from the magnitude stream. The variance of the phase errors for the symbols in a block is determined in calculating block 30 (discussed further below) and provided for use in determining signal presence and quality (denoted Signal Quality 1 in FIG. 2). As will be appreciated, the variance of the phase errors is an indication of the variability of the phase offset, and would be high if the signal were noise. A threshold variance value can be calculated using standard statistical techniques for a known probability of detection and false alarm rate. Variances over the threshold indicate that the signal is noise (at a known confidence level) and that the signal is unacceptable for acquisition.

The magnitude of the output from converter 20 is also provided to integrator 32 for non-coherent integration. Since offset frequency induced phase offsets of 45° per symbol would significantly degrade the result if coherently combined, non-coherent integration is used. This eliminates the need (and the hardware) in the prior art to Doppler shift or to correct for oscillator offset prior to the correlator. The integrated output is provided to timer 34 for determination of symbol timing and bit sync amplitude. The bit sync amplitude is an average magnitude of the symbols in polar coordinates and is a measure of signal amplitude that is provided for use in determining signal presence and quality (denoted Signal Quality 2 in FIG. 2).

The combination of frequency offset variance (Signal Quality 1) and average magnitude (Signal Quality 2) may be used to determine whether the received signal is a preamble for a data signal and the quality of the received signal on a particular antenna. The frequency offset variance is a good measure of variability that is insensitive to signal amplitude, while the average amplitude is a good measure of signal level that is insensitive to variability. These two measures are thus independent and may be used with a high degree of assurance that the determination of signal presence and quality will be accurate.

Figure 3:
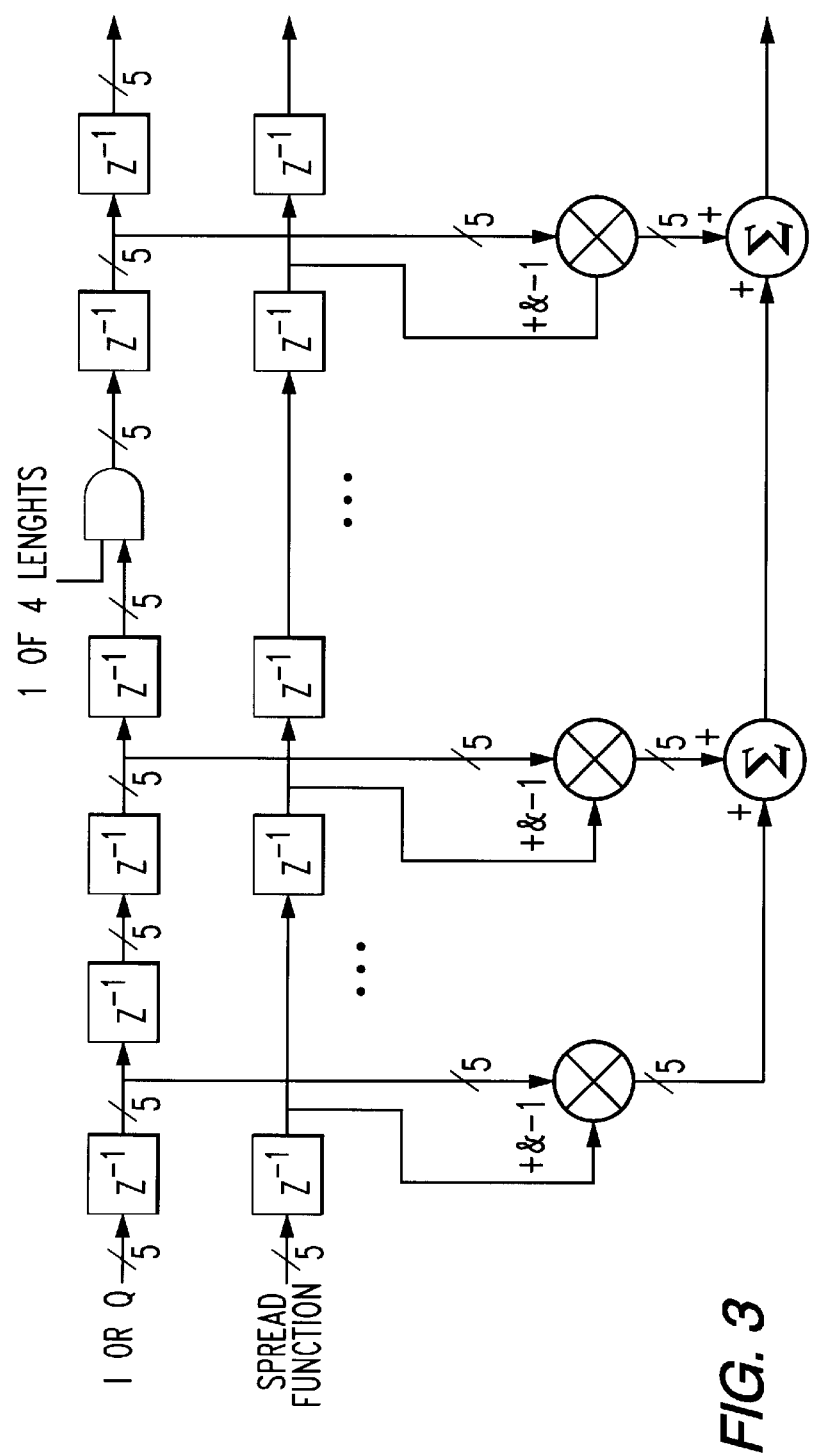
FIG. 3 is a partial block diagram of an embodiment of a correlator in the demodulator of FIG. 1.

With reference now to FIG. 3, correlator 16/18 may include an adder tree of a length appropriate for the number of symbols in a block in a data signal preamble. In this embodiment the direct sequence acquisition signal has a short eleven chip fixed PN spreading pattern on each DBPSK symbol, thereby permitting the use of a short correlator or time invariant matched filter to capture the data symbols in the data signal. The correlator provides an output that is a compressed pulse whose amplitude indicates how strongly the input signal matches the desired signal (that is, the degree of correlation among symbols in a block.) The input to the correlator may be sampled at twice a predetermined chip rate to reduce losses due to analog-to-digital sampling on the chip edges. The correlator stores each sample, but only every other input sample is used for each correlation output sample thereby saving one-half of the correlator adder tree, as illustrated in FIG. 3. Thus, no input samples are dropped and the correlator is implemented using half the number of multipliers that would otherwise be required. The correlator output is at the input rate of twice per chip so that performance loss is minimal while hardware savings are large. FIG. 3 illustrates a portion of a correlator that may be expanded as needed by adding AND gates in the serial shift registers. The power consumed is minimized because unused adders have constant inputs. The circuit illustrates the processing of an eleven bit PN code with twenty-two samples taken at analog-to-digital converter 12/14 into correlator 16/18, two samples per PN code bit or chip.

The determination of the variance of the frequency offsets uses the phase roll from symbol to symbol which gives the frequency offset. The preamble is presumed to be BPSK modulated by a scrambler so that data must be stripped before phase roll measurements are taken. As discussed above, correlator output is converted to the polar coordinates. Stripping off BPSK data in polar form may be accomplished by removing the most significant bit (MSB) of the two's complement angle data. The remaining angles are differenced to derive the frequency term. This term is in the form of the phase increment per symbol, so it is independent of the number of chips per symbol. Recall that the measurements are made on the symbols in a block of sixteen symbols in our example. After losing one symbol in the correlator, the remaining fifteen are differenced, giving fourteen differences. To get the phase increment per symbol, a multiplication by 16/14 (or 1+⅛) is performed so that a divide-by-16 (easy to implement in hardware) can be used. This is done with shift and add stages and is easier than dividing by 14.

The signal quality evaluation may be based on the variance of the phases discussed above. One method of determining the variance is to subtract the frequency estimate from each estimate, square the result, and average the squares. However, this would require two passes through the data, and the preferred method is use the standard statistical formula for the variance:

$$Var = (\Sigma X_i)^2 - \frac{\Sigma (X_i)^2}{N} \qquad (1)$$

where N=14 in this example, and $X_i$ is the phase offset for each symbol. Since this would require a divide-by-14, the formula may be scaled to:

$$\frac{7}{8} Var = \frac{7}{8} (\Sigma X_i)^2 - \frac{\Sigma (X_i)^2}{16} \qquad (2)$$

The ⅞ factor can implemented with 1 minus ⅛ logic that can be performed with shifts and ADDs.

The phase roll described above may be used to seed phase locked loop 32 that will aid in the demodulation of the subsequently received data signal. Once the preamble has been accepted and the best antenna chosen, acquisition is declared. The measurements already taken and stored in processor 28 may be used as initial conditions for phase locked loop 32. The frequency offset is estimated by averaging the phase rotation from symbol to symbol during the preamble and before phase locked loop 32 is enabled. Frequency offset is provided to phase locked loop 32 as an initial condition to accelerate phase lock, thereby saving time over the classical phase locked loop used in the prior art. Additionally, a one symbol absolute phase sample is taken by processor 28 and used to set the starting phase of a numerically controlled oscillator (NCO) 24. Once seeded, NCO 24 may be enabled and connected to lead/lag filter 26.

The stream from converter 20 may be decimated to the symbol rate and the phase corrected for frequency offset before PSK demodulation in demodulator 22. Phase errors from demodulator 22 may be fed to NCO 24 through a lead/lag filter 26 to achieve and maintain phase lock.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of evaluating a data signal preamble recieved on an antenna to determine whether the antenna should receive the data signal following the preamble, the preamble including a plurality of symbols, the method comprising the steps of:
    (a) providing each symbol in a block of the symbols in a data signal preamble recieved on an antenna in I and O components to a pair of correlators, each of the correlators for removing a spreading sequence in the symbols, the correlators sampling each symbol at twice a predetermined chip rate and the output signals from the correlators at each sample time are based only on alternating ones of the samples;
    (b) determining frequency offsets from a desired frequency for each symbol in the block of symbols;
    (c) determining the variance of the determined frequency offsets for plural symbols in the block of symbols;
    (d) determining the average magnitude of the symbols in the block of symbols, the determination of average magnitude being performed in parallel with the determination of variance of the frequency offsets; and
    (e) evaluating the determined variance and the determined average magnitude for the block of symbols to determine whether the received preamble is noise and to assess reception quality at the antenna.

2. The method of claim 1 further comprising the step of repeating steps (b) through (d) until acquisition is declared, and further evaluating the determined variance for plural blocks of symbols to improve the accuracy of the determination whether the recieved preamble is noise.

3. The method of claim 1 further comprising the step of combining the output signals from the pair of correlators and converting the combined output signals to polar coordinates.

4. The method of claim 3 further comprising the step of non-coherently integrating the polar coordinate outputs for the symbols in the block of symbols.

5. A method of evaluating a data signal preamble received on two antennas so that one of the two antennas can be selected to receive the subsequent data signal, the preamble including a plurality of symbols, the method comprising the steps of:
    (a) initially providing a block of symbols in a data signal preamble in I and O components to a pair of correlators, each of the correlators providing an output signal that indicates the correlation among the symbols in the block of symbols, sampling each symbol at twice a predetermined chip rate, and storing each of the samples, the output signals from the correlators at each sample time are based only on alternating ones of the stored samples;
    (b) determining frequency offsets from a desired frequency for each symbol in the block of symbols in the data signal preamble received on one of two antennas;
    (c) determining the variance of the determined frequency offsets for plural symbols in the block of symbols;
    (d) determining the average magnitude of the symbols in the block of symbols;
    (e) evaluating the determined variance and the determined average magnitude for the block of symbols to determine whether the received preamble is noise and to assess reception quality at the one antenna;
    (f) repeating steps (d) through (d) for a block of symbols in the preamble received at the other of the two antennas; and
    (g) comparing the evaluation results for the two antennas to determine which one of the two antennas is to receive the subsequent data signal.

6. The method of claim 5 further comprising after step (f) the steps of repeating steps (b) through (f) until acquisition is declared, and further evaluating the determined variance for plural blocks of symbols received at the two antennas to improve the accuracy of the determination whether the received preamble is noise.

7. The method of claim 5 further comprising the steps of providing a single receiver for carrying out steps (b) through (e), and serially providing blocks of symbols from alternate ones of the two antennas to the receiver.

8. The method of claim 5 wherein step (d) is carried out in parallel with steps (b) and (c).

9. The method of claim 5 wherein prior to step (d) the symbols in the block of symbols are converted to polar coordinates.

10. The method of claim 5 further comprising the step of combining the output signals from the pair of correlators and converting the combined output signals to polar coordinates.

11. The method of claim 10 further comprising the step of non-coherently integrating the polar coordinate outputs for the symbols in the block of symbols.

12. A radio receiver for evaluating a data signal preamble received on two antennas so that one of the two antennas can be selected to receive the subsequent data signal, the preamble including a plurality of symbols, the receiver comprising:

means for providing a block of symbols in I and O components to a pair of correlators;

each of the correlators for removing a spreading sequence in the symbols, the correlators sampling each symbol at twice a predetermined chip rate and the output signals from the correlators at each sample time being based only on alternating ones of the samples;

means for determining frequency offsets from a desired frequency for each symbol in the symbols in a data signal preamble received on one of two antennas;

means for determining the variance of the determined frequency offsets for plural symbols in the block of symbols;

means for determining the average magnitude of the symbols in the block of symbols;

means for evaluating the determined variance and the determined average magnitude for the block of symbols to determine whether the received preamble is noise and to assess reception quality at the one antenna;

means for comparing the evaluation results for the two antennas to determine which one of the two antennas is to receive the subsequent data signal.

13. The radio receiver of claim 12 further comprising a means for determining, evaluating, and comparing variance and magnitude for plural blocks within a preamble to improve the accuracy of the determination whether the received preamble is noise.

14. The radio receiver of claim 12 further comprising a means for combining the output signals from the pair of correlators and converting the combined output signals to polar coordinates.

15. The radio receiver of claim 14 further comprising a means for non-coherently integrating the polar coordinate outputs for the symbols in the block of symbols.

16. The radio receiver of claim 13 wherein the plural blocks are consecutive.

17. The radio receiver of claim 12 wherein the means for evaluating the determined variance and the determined average magnitude further comprises a noise threshold filter.

18. The radio receiver of claim 12 wherein the evaluation results are used as an initial condition for a phase locked loop.

19. The method of claim 2 wherein the plural blocks are consecutive.

20. The method of claim 1 wherein the determined variance is evaluated based on a threshold.

21. The method of claim 1 wherein the determined average magnitude is evaluated based on a threshold.

22. The method of claim 1 wherein the step of evaluating the determined variance and the determined average magnitude is used to initialize a phase locked loop.

23. The method of claim 6 wherein the plural blocks are consecutive.

24. The method of claim 5 wherein the determined variance is evaluated based on a threshold.

25. The method of claim 5 wherein the determined average magnitude is evaluated based on a threshold.

26. The method of claim 5 wherein the step of evaluating the determined variance and the determined average magnitude is used to initialize a phase locked loop.

* * * * *